US012742029B2

(12) United States Patent
Fukuhara et al.

(10) Patent No.: US 12,742,029 B2
(45) Date of Patent: Sep. 22, 2026

(54) ETHYLENE-VINYL ALCOHOL COPOLYMER AND AQUEOUS SOLUTION USING SAME

(71) Applicant: KURARAY CO., LTD., Kurashiki (JP)

(72) Inventors: Tadahito Fukuhara, Tsukuba (JP); Tatsuya Tanida, Frankfurt am Main (DE)

(73) Assignee: KURARAY CO., LTD., Kurashiki (JP)

( * ) Notice: Subject to any disclaimer, the term of this patent is extended or adjusted under 35 U.S.C. 154(b) by 1203 days.

(21) Appl. No.: 17/603,699

(22) PCT Filed: Apr. 13, 2020

(86) PCT No.: PCT/JP2020/016255
§ 371 (c)(1),
(2) Date: Oct. 14, 2021

(87) PCT Pub. No.: WO2020/213554
PCT Pub. Date: Oct. 22, 2020

(65) Prior Publication Data

US 2022/0153891 A1 May 19, 2022

(30) Foreign Application Priority Data

Apr. 15, 2019 (JP) ................................ 2019-077378

(51) Int. Cl.
*C08F 216/06* (2006.01)
*C08F 2/01* (2006.01)
(Continued)

(52) U.S. Cl.
CPC .............. *C08F 216/06* (2013.01); *C08F 2/01* (2013.01); *C08F 6/10* (2013.01); *C08F 8/12* (2013.01);
(Continued)

(58) Field of Classification Search
CPC .. C08F 216/06; C08F 2/01; C08F 6/10; C08F 8/12; C08F 6/008; C08F 18/08;
(Continued)

(56) References Cited

U.S. PATENT DOCUMENTS 5,599,870 A 2/1997 Nakamae et al.
6,472,470 B1 * 10/2002 Fujiwara .................. C08F 8/12 525/61
(Continued)

FOREIGN PATENT DOCUMENTS

EP 1 008 605 A1 6/2000
JP 8-81666 A 3/1996
(Continued)

OTHER PUBLICATIONS

Extended European Search Report issued Jan. 4, 2023 in European Patent Application No. 20791942.4, 7 pages.
(Continued)

*Primary Examiner* — Mark Eashoo
*Assistant Examiner* — Zhen Liu
(74) *Attorney, Agent, or Firm* — Oblon, McClelland, Maier & Neustadt, L.L.P.

(57) ABSTRACT

An ethylene-vinyl alcohol copolymer may have an ethylene unit content of 1 mol % or more and less than 15 mol %, a
(Continued)

saponification degree of 85 mol % or more and less than 99.9 mol %, and a viscosity-average degree of polymerization of 200 or more and less than 3000. The copolymer may contain a molecule containing a structure (I)

(I)

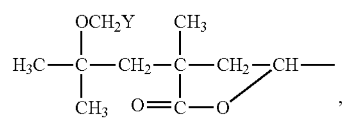

Y being H or $-CH_3$, at an end; and a molecule containing a structure (II)

(II)

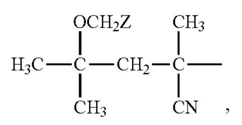

Z being H or $-CH_3$, at an end, a total content of the structure (I) and the structure (II) in all monomer units is 0.001 mol % or more and less than 0.1 mol %, and a molar ratio R [I/(I+II)] of the structure (I) to the total of the structure (I) and the structure (II) satisfies formula (1):

$$R < 0.92 - Et/100, \quad (1)$$

Et being ethylene unit content (mol %).

16 Claims, 1 Drawing Sheet

(51) Int. Cl.

| | |
|---|---|
| ***C08F 6/10*** | (2006.01) |
| ***C08F 8/12*** | (2006.01) |
| ***C08K 3/22*** | (2006.01) |
| ***C08K 3/34*** | (2006.01) |
| ***C08L 23/0861*** | (2025.01) |
| ***C09D 129/04*** | (2006.01) |
| ***C09J 129/04*** | (2006.01) |

(52) U.S. Cl.
CPC ........ *C08L 23/0861* (2013.01); *C09D 129/04* (2013.01); *C09J 129/04* (2013.01); *C08K 3/22* (2013.01); *C08K 3/346* (2013.01); *C08L 2201/54* (2013.01)

(58) Field of Classification Search
CPC .. C08F 210/02; C08F 218/08; C08L 23/0861; C08L 2201/54; C09D 129/04; C09J 129/04; C08K 3/22; C08K 3/346
See application file for complete search history.

(56) References Cited

U.S. PATENT DOCUMENTS

| | | | |
|---|---|---|---|
| 2004/0204549 A1 | 10/2004 | Yoshimi et al. | |
| 2015/0259856 A1* | 9/2015 | Kumaki | D21H 27/10 428/514 |
| 2021/0108111 A1 | 4/2021 | Tanida et al. | |

FOREIGN PATENT DOCUMENTS

| | | |
|---|---|---|
| JP | 2000-309607 A | 11/2000 |
| JP | 2001-164219 A | 6/2001 |
| JP | 2001-172593 A | 6/2001 |
| JP | 2001-206999 A | 7/2001 |
| JP | 2019-44083 A | 3/2019 |
| WO | WO 2019/203216 A1 | 10/2019 |

OTHER PUBLICATIONS

International Search Report issued on Jun. 30, 2020 in PCT/JP2020/016255 filed Apr. 13, 2020, 2 pages.
U.S. Appl. No. 17/603,927, filed Oct. 14, 2021, US 2022/0195159 A1, Yoshida, et al.

* cited by examiner

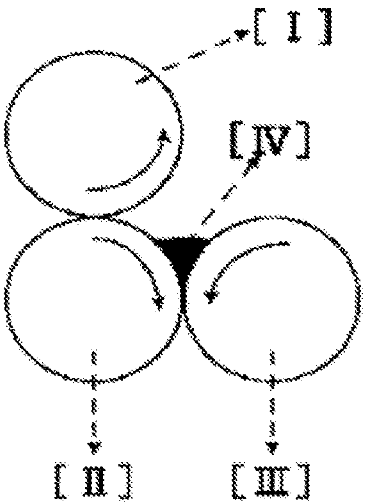
[ I ]
[ IV ]
[ II ]
[ III ]

ETHYLENE-VINYL ALCOHOL COPOLYMER AND AQUEOUS SOLUTION USING SAME

CROSS-REFERENCE TO RELATED APPLICATIONS

The present application is the national stage of international application PCT/JP2020/016255, filed on Apr. 13, 2020, and claims the benefit of the filing date of Japanese Appl. No. 2019-077378, filed on Apr. 15, 2019.

TECHNICAL FIELD

The present invention relates to an ethylene-vinyl alcohol copolymer having excellent water solubility, and an aqueous solution and an adhesive using the ethylene-vinyl alcohol copolymer. Further, the present invention relates to a coating method for applying the aqueous solution at high speed and a method for producing the ethylene-vinyl alcohol copolymer. This application claims priority to Japanese Patent Application No. 2019-077378, filed on Apr. 15, 2019, the disclosure of which is cited in its entirety as a part of this application by reference.

BACKGROUND ART

Polyvinyl alcohol (which may be hereinafter referred to as "PVA") is known as a water-soluble synthetic polymer and widely used for applications such as a raw material for vinylon which is a synthetic fiber, a paper processing agent, a fiber processing agent, an adhesive, a stabilizer for emulsion polymerization and suspension polymerization, a binder for inorganic substances, and a film. In particular, since PVA-based adhesives are inexpensive and well-balanced adhesives which are excellent in initial tackiness, equilibrium adhesive strength, and stability of adhesion over time, they are widely used for applications such as paperboard, corrugated cardboard, paper tubes, fusuma, and wallpaper.

An ethylene-modified PVA (ethylene-vinyl alcohol copolymer) to be obtained by copolymerizing ethylene with vinyl acetate, followed by saponification is excellent in various performances. For example, Patent Document 1 discloses an ethylene-vinyl alcohol copolymer with an ethylene unit content of 2 to 19 mol %, a polymerization degree of 200 to 2000, a saponification degree of 80 to 99.99 mol %, and a total content of carboxyl groups and lactone rings of 0.02 to 0.4 mol %. The ethylene-vinyl alcohol copolymer has been developed for various applications. However, since the ethylene-vinyl alcohol copolymer contains hydrophobic ethylene units, it requires long-term heating to dissolve in water, which is not economical. Thus, there has been a demand for an ethylene-vinyl alcohol copolymer which dissolves by short-term heating.

Adhesives are strongly required to have not only water-resistant adhesiveness but also high-speed coatability on paper, for reducing the costs and improving the productivity. Patent Document 2 discloses an adhesive using a PVA containing a predetermined amount of 1,2-glycol bond in a molecule. However, such an adhesive has insufficient water-resistant adhesiveness.

Patent Document 3 discloses an adhesive using an ethylene-vinyl alcohol copolymer, for improving the water-resistant adhesiveness. However, such an adhesive may have insufficient high-speed coatability.

PRIOR ART DOCUMENTS

Patent Documents

Patent Document 1: JP 2000-309607 A
Patent Document 2: JP 2001-164219 A
Patent Document 3: JP 2001-172593 A

SUMMARY OF INVENTION

Problems to be Solved by the Invention

The present invention has been accomplished in order to solve the aforementioned problems, and it is an object of the present invention to provide an ethylene-vinyl alcohol copolymer having excellent water-resistant adhesiveness and excellent high-speed coatability when used as an adhesive as well as excellent water solubility, and an aqueous solution thereof. Further, it is an object of the present invention to provide a method for producing such an ethylene-vinyl alcohol copolymer.

Means for Solving the Problems

The aforementioned problems can be solved by providing:

[1] an ethylene-vinyl alcohol copolymer having an ethylene unit content of 1 mol % or more and less than 15 mol %, a saponification degree of 85 mol % or more and less than 99.9 mol %, and a viscosity-average degree of polymerization of 200 or more and less than 3000, wherein the copolymer comprises a molecule containing a structure (I) below at an end and a molecule containing a structure (II) below at an end, a total content of the structure (I) and the structure (II) in all monomer units is 0.001 mol % or more and less than 0.1 mol %, and a molar ratio R [I/(I+II)] of the structure (I) to the total of the structure (I) and the structure (II) satisfies formula (1) below:

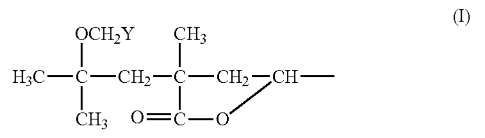

(I)

wherein Y represents a hydrogen atom or a methyl group;

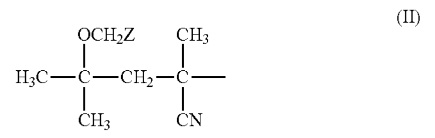

(II)

wherein Z represents a hydrogen atom or a methyl group; and $$R < 0.92 - Et/100 \quad (1)$$

wherein Et represents the ethylene unit content (mol %);

[2] an aqueous solution comprising the ethylene-vinyl alcohol copolymer (A) of [1];

[3] an adhesive consisting of the aqueous solution of [2];

[4] a method for producing the ethylene-vinyl alcohol copolymer of [1] to [3], comprising: a copolymerization step of copolymerizing ethylene with vinyl ester using an azonitrile compound containing an alkoxy group as a polymerization initiator to obtain an ethylene-vinyl ester copolymer; a saponification step of saponifying the ethylene-vinyl ester copolymer in the presence of a basic catalyst to obtain an ethylene-vinyl alcohol copolymer; and a washing step of washing the ethylene-vinyl alcohol copolymer obtained with an organic solvent, wherein in the washing step, the ethylene-vinyl alcohol copolymer is washed with a first washing solution and then washed with a second washing solution having a water content lower than that of the first washing solution; and

[5] a coating method comprising applying the aqueous solution of [2] to a base material at a coating speed from 50 to 1000 m/minute.

Effects of the Invention

The ethylene-vinyl alcohol copolymer of the present invention has excellent water solubility. Further, an adhesive using the ethylene-vinyl alcohol copolymer has excellent water-resistant adhesiveness and excellent high-speed coatability. The production method of the present invention can produce such an ethylene-vinyl alcohol copolymer.

BRIEF DESCRIPTION OF THE DRAWINGS

FIG. 1 is a schematic view of three rolls used for evaluation of adhesives in EXAMPLES.

MODES FOR CARRYING OUT THE INVENTION

[Ethylene-Vinyl Alcohol Copolymer]

It is important that the ethylene-vinyl alcohol copolymer of the present invention (which may be hereinafter abbreviated as EVOH) has an ethylene unit content of 1 mol % or more and less than 15 mol %. When the ethylene unit content is less than 1 mol %, the hydrophilicity is excessively high, and aggregates are formed when EVOH powder dissolves, which may rather make it difficult to dissolve or reduce the water-resistant adhesiveness of an adhesive to be obtained. Meanwhile, when the ethylene unit content is 15 mol % or more, the hydrophobicity is excessively high, thereby reducing the water solubility of the EVOH. The ethylene unit content is preferably less than 10 mol %, more preferably less than 8 mol %, further preferably less than 5 mol %. The ethylene unit content is measured by the method described later in EXAMPLES.

It is important that the EVOH of the present invention has a viscosity-average degree of polymerization of 200 or more and less than 3000. When the viscosity-average degree of polymerization is less than 200, an adhesive to be obtained has insufficient water-resistant adhesiveness. The viscosity-average degree of polymerization is preferably 400 or more, more preferably 450 or more. Meanwhile, when the viscosity-average degree of polymerization is 3000 or more, the EVOH has a reduced water solubility, and an aqueous solution to be obtained has a high viscosity and becomes difficult to handle. The viscosity-average degree of polymerization is preferably less than 2800, more preferably less than 2500. The viscosity-average degree of polymerization is measured according to JIS K 6726:1994. Specifically, the viscosity-average degree of polymerization is determined by the following formula using the limiting viscosity [n] of the EVOH (liter/g) measured in water at 30° C. When the saponification degree of the EVOH is less than 99.5 mol %, the limiting viscosity is measured after saponification is performed until the saponification degree reaches 99.5 mol % or more.

$$P=([\eta]\times 10^4/8.29)^{(1/0.62)}$$

It is important that the saponification degree of the EVOH is 85 mol % or more and less than 99.9 mol %. When the saponification degree is less than 85 mol %, the solubility of the EVOH in water may decrease, or the water-resistant adhesiveness of an adhesive to be obtained may be insufficient. The saponification degree is preferably 90 mol % or more. Meanwhile, an EVOH having a saponification degree of 99.9 mol % or more may be difficult to produce. The saponification degree is measured according to JIS K 6726:1994.

It is important that the EVOH of the present invention comprises a molecule containing the following structure (I) at an end and a molecule containing the following structure (II) at an end, and the total content of the structure (I) and the structure (II) in all monomer units is 0.001 mol % or more and less than 0.1 mol %. When the total content is 0.1 mol % or more, the water solubility of the EVOH may decrease, or the high-speed coatability and the water-resistant adhesiveness of an adhesive to be obtained may decrease. The total content is preferably 0.07 mol % or less, more preferably 0.05 mol % or less. Meanwhile, the total content of 0.001 mol % or more improves the EVOH productivity of the present invention. The contents of the structure (I) and the structure (II) are measured by the method described later in EXAMPLES. In this description, monomer units in the EVOH mean ethylene units, vinyl alcohol units, vinyl ester units, and other monomer units copolymerized as required, and all monomer units mean the total amount of moles of such monomer units. At this time, units containing a terminal structure shown by the structure (I) or the structure (II) are also included in the monomer units for calculation.

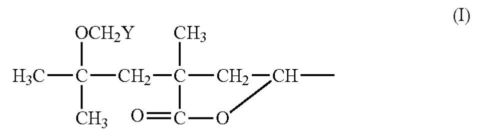

(I)

wherein Y represents a hydrogen atom or a methyl group;

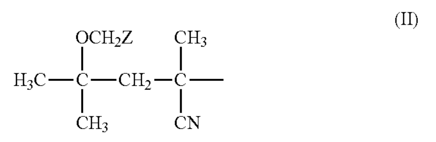

(II)

wherein Z represents a hydrogen atom or a methyl group; and

It is important that a molar ratio R [I/(I+II)] of the structure (I) to the total of the structure (I) and the structure (II) in the EVOH of the present invention satisfies formula (1) below. When the molar ratio R [I/(I+II)] is large and does not satisfy formula (1) below, the water solubility of the EVOH may decrease, or the high-speed coatability of an adhesive to be obtained may decrease. The molar ratio R [I/(I+II)] preferably satisfies formula (2) below, more preferably formula (3) below, further preferably formula (4) below. The molar ratio R [I/(I+II)] can be adjusted by washing the EVOH after saponification. Meanwhile, the molar ratio R [I/(I+II)] is preferably 0.1 or more, more preferably 0.3 or more, further preferably 0.5 or more, particularly preferably 0.6 or more. This is because it is difficult to adjust the value to less than 0.1 due to the industrial method for producing EVOHs, and therefore the production cost increases. For maintaining the water resistance, it is preferred that the molar ratio R [I/(I+II)] also satisfy formula (5) below:

$$R < 0.92 - Et/100 \quad (1)$$

$$R < 0.90 - Et/100 \quad (2)$$

$$R < 0.88 - Et/100 \quad (3)$$

$$R < 0.85 - Et/100 \quad (4)$$

$$R > 0.65 - Et/100 \quad (5)$$

wherein Et represents the ethylene unit content (mol %).

The water insoluble content in the EVOH of the present invention is preferably 10000 ppm or less, more preferably 5000 ppm or less, further preferably 3000 ppm or less. The water insoluble content in the EVOH is determined by adding 4 g of the EVOH to 96 g of water at 30° C. under stirring at 300 rotations/minute, then increasing the water temperature up to 90° C. over 120 minutes, and then recovering the insoluble content in the aqueous solution obtained to measure the dry mass thereof. Specifically, the water insoluble content in the EVOH is measured by the method described later in EXAMPLES.

The EVOH of the present invention may contain 1,2-glycol bond. In such a case, the amount of 1,2-glycol bond in the EVOH is preferably 1.2 mol % or more and less than 2.0 mol %, more preferably 1.2 mol % or more and less than 1.6 mol %.

The method for producing the EVOH of the present invention is not specifically limited but is preferably a method comprising: a copolymerization step of copolymerizing ethylene with vinyl ester using an azonitrile compound containing an alkoxy group as a polymerization initiator to obtain an ethylene-vinyl ester copolymer; a saponification step of saponifying the ethylene-vinyl ester copolymer in the presence of a catalyst to obtain an ethylene-vinyl alcohol copolymer; and a washing step of washing the ethylene-vinyl alcohol copolymer obtained with an organic solvent.

In the copolymerization step, vinyl ester is copolymerized with ethylene to obtain an ethylene-vinyl ester copolymer. As a method for the polymerization, conventionally known methods such as bulk polymerization, solution polymerization, suspension polymerization, emulsion polymerization, and dispersion polymerization are employed. From an industrial point of view, preferred polymerization methods are solution polymerization, emulsion polymerization, and dispersion polymerization. In the polymerization operation, any of a batch process, a semi-batch process, and a continuous process can be adopted.

Examples of the vinyl ester include vinyl acetate, vinyl formate, vinyl propionate, vinyl caprylate, and vinyl versatate. Among these, vinyl acetate is preferred from an industrial point of view.

In the polymerization, monomers other than vinyl ester and ethylene may be copolymerized, as long as the objective of the present invention is not impaired. Examples of the monomers which can be used include α-olefins such as propylene, n-butene, and isobutylene; (meth)acrylic acids and salts thereof; (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth) acrylate, dodecyl (meth)acrylate, and octadecyl (meth)acrylate; acrylamide compounds such as (meth)acrylamide, N-methyl (meth)acrylamide, N-ethyl (meth)acrylamide, N,N-dimethyl (meth)acrylamide, diacetone (meth)acrylamide, (meth)acrylamidopropanesulfonic acid and salts thereof, (meth)acrylamidopropyldimethylamine and salts thereof or quaternary salts thereof, and N-methylol (meth) acrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid, and fumaric acid and salts thereof or esters thereof; vinylsilyl compounds such as vinyltrimethoxysilane; and isopropenyl acetate. One of these may be used alone, or two or more of them may be used. The amount of such other monomers to be copolymerized is generally 10 mol % or less. In this description, the term "(meth)acrylic" generally refers to methacrylic and acrylic.

The polymerization temperature is not specifically limited and is preferably about 0 to 180° C., more preferably room temperature to 160° C., further preferably 30 to 150° C. In the case of polymerization at the boiling point of the solvent used during the polymerization or lower, either boil polymerization under reduced pressure or non-boil polymerization at normal pressure can be selected. In the case of polymerization at the boiling point of the solvent used during the polymerization or higher, either pressurized non-boil polymerization or pressurized boil polymerization can be selected.

In the copolymerization step, an azonitrile compound containing an alkoxy group is used as a polymerization initiator. Examples of the azonitrile compound containing an alkoxy group preferably used in the present invention include 2,2'-azobis(4-methoxy-2,4-dimethylvaleronitrile) and 2,2'-azobis(4-ethoxy-2,4-dimethylvaleronitrile). Among them, 2,2'-azobis(4-methoxy-2,4-dimethylvaleronitrile) is preferred. Such an azonitrile compound containing an alkoxy group is unlikely to undergo abnormal decomposition due to contact with metals and has a high degradation rate at low temperatures. Accordingly, ethylene and vinyl ester can be copolymerized safely, efficiently, and economically by using the azonitrile compound. Specifically, it is preferred to copolymerize ethylene and vinyl ester in a solution using the azonitrile compound containing an alkoxy group as a polymerization initiator to obtain an ethylene-vinyl ester copolymer solution in the copolymerization step.

The amount of the polymerization initiator to be added is not specifically limited but is preferably 0.0001 to 1 part by mass with respect to 100 parts by mass of vinyl ester. When the amount of the polymerization initiator to be added is less than 0.0001 parts by mass, the EVOH productivity may decrease. The amount to be added is more preferably 0.0005 parts by mass or more, further preferably 0.0015 parts by mass or more, particularly preferably 0.002 parts by mass or more, most preferably 0.0025 parts by mass or more. Meanwhile, when the amount of the polymerization initiator to be added is over 1 part by mass, the water solubility, the water-resistant adhesiveness, and the high-speed coatability of an EVOH to be obtained may decrease. The amount to be added is more preferably 0.8 parts by mass or less, further preferably 0.6 parts by mass or less, particularly preferably 0.5 parts by mass or less.

The ethylene pressure in the polymerization reactor during the polymerization is not limited but is preferably 0.01 to 0.9 MPa, more preferably 0.05 to 0.7 MPa, further preferably 0.1 to 0.65 MPa. The polymerization ratio at the exit of the polymerization reactor is not specifically limited but is preferably 10 to 90%, more preferably 15 to 85%.

The production method of the present invention preferably comprises a step of removing vinyl ester monomers remaining in the vinyl ester copolymer solution obtained after the copolymerization step. The method therefor is not particularly limited, but examples thereof include a method of heating the polymerization solution, a method of continuously adding methanol to the polymerization solution under heating, a method of continuously introducing methanol vapor into the polymerization solution, and a method of continuously introducing methanol vapor into the polymerization solution under heating. The vinyl ester monomers may be removed while continuously adding the polymerization solution into the reactor for the removal step, or the vinyl ester monomers may be removed after the polymerization solution is put into the reactor at a time.

In the step of removing residual vinyl ester monomers, the temperature for heating the polymerization solution is not particularly limited but is generally 10° C. to 120° C. It is also preferred that the vinyl ester monomers are removed at a temperature around the boiling point of methanol or the residual vinyl ester monomers. For example, in the case where the residual vinyl ester monomers are vinyl acetate, the temperature is preferably about 50 to 90° C.

The step of saponifying the ethylene-vinyl ester copolymer obtained in the presence of a catalyst is performed, to obtain an ethylene-vinyl alcohol copolymer. To the saponification reaction of the ethylene-vinyl ester copolymer, alcoholysis or hydrolysis reaction using a basic catalyst such as sodium hydroxide, potassium hydroxide, and sodium methoxide, or an acidic catalyst such as p-toluenesulfonic acid, which are conventionally known, can be applied. As a catalyst to be used for the saponification reaction, a basic catalyst is preferred. As a solvent to be used for the saponification reaction, alcohols such as methanol and ethanol; esters such as methyl acetate and ethyl acetate; ketones such as acetone and methyl ethyl ketone; and aromatic hydrocarbons such as benzene and toluene. One of these may be used alone, or two or more of them may be used in combination. Among them, it is convenient and thus preferred to perform the saponification reaction of the ethylene-vinyl ester copolymer using methanol or a mixed solution of methanol and methyl acetate as a solvent in the presence of sodium hydroxide which is a basic catalyst. The amount of the catalyst to be used is preferably 0.001 to 0.5 in terms of a molar ratio to vinyl ester monomer units in the ethylene-vinyl ester copolymer. The molar ratio is more preferably 0.002 or more. Meanwhile, the molar ratio is more preferably 0.4 or less, further preferably 0.3 or less.

Further, the water content in the reaction solution during the saponification reaction is not specifically limited but is preferably 3.0 mass % or less, more preferably 2.5 mass % or less. Meanwhile, the water content is preferably 0.1 mass % or more, more preferably 0.3 mass % or more.

After the saponification step, a washing step of washing the EVOH obtained with an organic solvent is performed. As a result of diligent studies, the inventors have found that the residue of the saponification catalyst and water which are present together with the EVOH after the saponification affect the ratio of the structure (I) and the structure (II) in the EVOH. Further, they succeeded in adjusting the molar ratio R [I/(I+II)] by washing the EVOH after the saponification in two or more steps and adjusting the water content of the organic solvent to be used as a washing solution in each step. The molar ratio R [I/(I+II)] satisfying formula (1) above improves the water solubility of the EVOH and the high-speed coatability of the aqueous solution to be obtained.

Examples of the solvent to be used as a washing solution include alcohols such as methanol and ethanol, and esters such as methyl acetate and ethyl acetate. One of these may be used alone, or two or more of them may be used in combination.

In the washing step, the EVOH after the saponification needs to be washed in two or more steps and is preferably washed in two steps. Further, it is important that the water content of the second washing solution to be used in the second step is lower than that of the first washing solution to be used in the first step. Thereby, the content of the structure (II) increases, and the content of the structure (I) decreases, to decrease the molar ratio R [I/(I+II)], so that an EVOH satisfying formula (1) above can be easily obtained. A ratio (first/second) of the water content of the first washing solution to the water content of the second washing solution is preferably 1.1 or more, more preferably 1.5 or more, further preferably 2.0 or more, particularly preferably 3.0 or more. Meanwhile, the ratio (first/second) is generally less than 500, preferably 100 or less, more preferably 50 or less, further preferably 20 or less.

The water content of the first washing solution is preferably 0.2 mass % or more, more preferably 0.3 mass % or more, further preferably 0.5 mass % or more. The upper limit is not limited, but the water content of the first washing solution is generally less than 5 mass %, preferably less than 3 mass %. When the water content is 5 mass % or more, the EVOH may be eluted in the washing solution, or the EVOH may be fused in the drying step.

Solvents such as methanol and methyl acetate generated in the EVOH production process after being distilled are generally reused as washing solutions, but the water content of such a solvent obtained by distillation may be less than 0.2% in many cases. In such a case, water may be added to the solvent intentionally, to adjust the water content.

The water content of the second washing solution is not particularly limited but is preferably less than 1 mass %, more preferably less than 0.5 mass %, further preferably less than 0.3 mass %, in view of the relationship with the water content of the first washing solution. The lower limit is not limited, but the water content of the second washing solution is generally 0.01 mass % or more. It is difficult to produce washing solutions with a water content of less than 0.01 mass %.

The temperature of the washing solutions to be used in the washing step is not limited but is preferably 20 to 60° C., more preferably 30 to 55° C., further preferably 35 to 50° C.

The washing time is not limited, but the average residence time at each step is preferably 3 to 120 minutes, more preferably 5 to 90 minutes, further preferably 10 to 75 minutes.

(Aqueous Solution)

An aqueous solution containing the EVOH of the present invention described above is a preferred embodiment of the EVOH. Since the EVOH of the present invention has high water solubility, an aqueous solution can be produced easily. Such an aqueous solution can be used for various applications including an adhesive, a dispersion stabilizer, a dressing, a binder, a paper processing agent, a viscosity modifier, a raw material for formed products such as a film, and a raw material for resins and post-reactions. Among them, an adhesive consisting of the aqueous solution is a more preferred embodiment of the present invention.

The content of the components (solid content) other than water and the organic solvents in the aqueous solution is preferably 1 to 50 mass %. The content is more preferably 3 mass % or more, further preferably 5 mass % or more. Meanwhile, the content is more preferably 45 mass % or less, further preferably 40 mass % or less.

The aqueous solution preferably further contains an inorganic filler. Examples of the inorganic filler include those used for the later-described adhesive. The content of the inorganic filler is preferably 20 to 500 parts by mass with respect to 100 parts by mass of the EVOH. The content is more preferably 50 parts by mass or more. Meanwhile, the content is more preferably 300 parts by mass or less.

The aqueous solution preferably further contains the later-described compound having a conjugated double bond and a molecular weight of 1000 or less. The content of the compound is preferably 0.000001 to 0.01 parts by mass with respect to 100 parts by mass of the EVOH. The content is more preferably 0.000002 parts by mass or more, further preferably 0.000003 parts by mass or more. Meanwhile, the content is more preferably 0.0075 parts by mass or less, further preferably 0.005 parts by mass or less, particularly preferably 0.0025 parts by mass or less.

The aqueous solution may further contain additives other than the EVOH, the later-described compound having a conjugated double bond and a molecular weight of 1000 or less, the inorganic filler, water, and the organic solvents. Examples of the other additives include those used for the later-described adhesive. The total content of the other additives is preferably 100 parts by mass or less, more preferably 50 parts by mass or less, further preferably 25 parts by mass or less, particularly preferably 10 parts by mass or less, with respect to 100 parts by mass of the EVOH.

In order to impart flexibility to a layer including the EVOH which is formed when the aqueous solution of the present invention is used as an antifreezing agent or an adhesive, the aqueous solution may further contain alcohols such as methanol, ethylene glycol, and glycerin, and a water-soluble organic solvent such as cellosolve. The content of such organic solvents is preferably 100 parts by mass or less, more preferably 50 parts by mass or less, further preferably 10 parts by mass or less, with respect to 100 parts by mass of water.

The method for producing the aqueous solution is not specifically limited and can be obtained, for example, by dissolving the EVOH in water. Specifically, it is obtained by adding the EVOH and the later-described compound having a conjugated double bond and a molecular weight of 1000 or less, the inorganic filler, or the other additives, as required, to water, and then dissolving the EVOH. When producing the aqueous solution, any of a batch process and a continuous process may be employed. When adding the compound having a conjugated double bond and a molecular weight of 1000 or less, the inorganic filler, or the other additives, (i) after the EVOH and the compound having a conjugated double bond and a molecular weight of 1000 or less, the inorganic filler, or the other additives are mixed in advance, the mixture obtained may be added to water, or (ii) the EVOH and the compound having a conjugated double bond and a molecular weight of 1000 or less, the inorganic filler, or the other additives may be sequentially added to water. When each component is added to water, the water is preferably stirred. The EVOH and the compound having a conjugated double bond and a molecular weight of 1000 or less, the inorganic filler, or the other additives, as required, are added to water, and a slurry obtained is heated, thereby dissolving the EVOH. At this time, any heating method such as heating by directly blowing vapor or indirect heating via a jacket is adopted.

The aqueous solution of the present invention is less likely to cause jumping and bubble intrusion, can be spread uniformly, and has less stringing, so as to have excellent high-speed coatability and excellent water-resistant adhesiveness. Accordingly, it can be suitably used for known applications in which an aqueous PVA solution has been conventionally used. For example, the aqueous solution is preferably used as an adhesive for paper such as paperboard, corrugated cardboard, paper tubes, fusuma, and wallpaper. A method for applying the aqueous solution to a base material is a preferred embodiment of the aqueous solution. At this time, the coating speed is preferably 50 to 1000 m/minute.

(Adhesive)

An adhesive comprising the aqueous solution containing the EVOH of the present invention is a further preferred embodiment of the present invention. The adhesive preferably further contains an inorganic filler. The type of the inorganic filler is not specifically limited and is appropriately selected depending on the adherend, the coating machine, the required performance, and the like. Examples of the inorganic filler include clays such as kaolinite, halloysite, pyrophyllite, and sericite, heavy, light, or surface-treated calcium carbonates, aluminum hydroxides, aluminum oxides, plasters, talcs, and titanium oxides. Among them, clays are preferred. One of these inorganic fillers may be used alone, or two or more of them may be used in combination. Since a uniform slurry solution is obtained without aggregation or settling of the inorganic filler in the aqueous solution, the average particle size of the inorganic filler is preferably 10 μm or less, more preferably 8 μm or less, further preferably 5 μm or less.

The content of the inorganic filler in the aqueous solution is preferably 20 to 500 parts by mass with respect to 100 parts by mass of the EVOH. When the content of the inorganic filler is less than 20 parts by mass, the expression of initial adhesive strength may be delayed. Further, the equilibrium adhesive strength, the shear stress, or the creep resistance may also decrease. The content is more preferably 50 parts by mass or more. Meanwhile, when the content of the inorganic filler exceeds 500 parts by mass, the fluidity of the adhesive may deteriorate, the inorganic filler may easily settle down in the aqueous solution, or the adhesion may decrease. The content is more preferably 300 parts by mass or less.

The adhesive may further contain additives other than the EVOH, the later-described compound having a conjugated double bond and a molecular weight of 1000 or less, the inorganic filler, water, and the organic solvents without inhibiting the effects of the present invention. Examples of the other additives include dispersants of metal salts of phosphate compounds such as sodium polyphosphate and sodium hexametaphosphate and inorganic substances such as water glass; polyacrylic acid and salts thereof; sodium alginate; anionic polymer compounds such as α-olefin-maleic anhydride copolymers and metal salts thereof; and nonionic surfactants such as ethylene oxide adducts of higher alcohols and copolymers of ethylene oxide and propylene oxide. Addition of these improves the fluidity of the adhesives. Further, carboxymethylcellulose, polyethylene oxide, a defoaming agent, a preservative, a fungicide, a coloring pigment, a deodorant, a fragrance, and the like can be added as the other additives, as required. Further, boric acid; borax; water-soluble boron compounds such as boric acid esters of polyhydric alcohols such as glycerin and ethylene glycol can be added, for further improving the adhesion. Further, natural glues such as starch, casein, gelatin, guar gum, arabic gum, and sodium alginates; processed natural glues such as CMC, oxidized starch, and methylcellulose, synthetic resin emulsions such as acrylic emulsions, polyvinyl acetate emulsions, ethylene-vinyl acetate copolymer emulsions, and SBR latexes; various rubber latexes, and the like can be added as the other additives. Further, known PVAs may be used as the other additives in combination, as long as the effects of the present invention are not impaired. The total content of the other additives is preferably 100 parts by mass or less, more preferably 50 parts by mass or less, further preferably 25 parts by mass or less, particularly preferably 10 parts by mass or less, with respect to 100 parts by mass of the EVOH.

The viscosity of the adhesive of the present invention may be adjusted depending on the application, but the B-type viscosity (at 30 rpm and 20° C.) is generally 100 to 8000 m Pa·s.

(Compound Having Conjugated Double Bond)

It is preferred to add a compound having a conjugated double bond and a molecular weight of 1000 or less to the EVOH, for improving the high-speed coatability. An EVOH composition containing the EVOH and the compound having a conjugated double bond and a molecular weight of 1000 or less is also a preferred embodiment of the present invention. Although the mechanism to improve the high-speed coatability is not clear, it is estimated that the interaction of a conjugated double bond site and an ethylene unit of the EVOH in a polar solvent appropriately inhibits the intermolecular interaction of the EVOH.

In the present invention, the compound having a conjugated double bond and a molecular weight of 1000 or less means a compound having a conjugated double bond between aliphatic double bonds, or a compound having a conjugated double bond between an aliphatic double bond and an aromatic ring. For a higher effect of improving the high-speed coatability and the water-resistant adhesiveness, the former is preferred. Further, the molecular weight is 1000 or less, preferably 800 or less, more preferably 500 or less.

The compound having a conjugated double bond between aliphatic double bonds has a structure in which carbon-carbon double bonds and carbon-carbon single bonds are alternately connected and is a compound having a conjugated double bond in which the number of carbon-carbon double bonds is two or more. Specifically, examples thereof include a conjugated diene compound having a conjugated structure in which two carbon-carbon double bonds and one carbon-carbon single bond are alternately connected, a conjugated triene compound having a conjugated structure in which three carbon-carbon double bonds and two carbon-carbon single bonds are alternately connected (e.g., 2,4,6-octatriene), and a conjugated polyene compound having a conjugated structure in which the larger number of carbon-carbon double bonds and carbon-carbon single bonds are alternately connected. Among them, the conjugated diene compound is preferred for a higher effect of improving the high-speed coatability and the water-resistant adhesiveness. The compound having a conjugated double bond and a molecular weight of 1000 or less to be used in the present invention may have a plurality sets of conjugated double bonds which are independently present in one molecule, and examples thereof also include a compound having three conjugated trienes in the same molecule like tung oil.

The compound having a conjugated double bond and a molecular weight of 1000 or less may have a functional group other than the conjugated double bonds. Examples of the other functional group include a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonate group and salts thereof, a phosphate group and salts thereof, and a polar group such as a halogen atom and a non-polar group such as a phenyl group. For a higher effect of improving the high-speed coatability and the water-resistant adhesiveness, the other functional group is preferably a polar group, more preferably a carboxy group and salts thereof, and a hydroxyl group. The other functional group may be directly bonded to a carbon atom in a conjugated double bond or may be bonded to a position away from the conjugated double bond. The multiple bond in the other functional group may be located at a position conjugatable to the conjugated double bond. For example, 1-phenyl-1,3-butadiene having a phenyl group, sorbic acid having a carboxy group, and the like are also used as the compound having a conjugated double bond. Further, the compound having a conjugated double bond and a molecular weight of 1000 or less may have a non-conjugated double bond or a non-conjugated triple bond.

Specifically, examples of the compound having a conjugated double bond and a molecular weight of 1000 or less include a compound having a conjugated double bond between aliphatic double bonds such as 2,3-dimethyl-1,3-butadiene, 4-methyl-1,3-pentadiene, 1-phenyl-1,3-butadiene, sorbic acid, and myrcene and a compound having a conjugated double bond between an aliphatic double bond and an aromatic ring such as 2,4-diphenyl-4-methyl-1-pentene, α-methylstyrene polymer, and 1,3-diphenyl-1-butene.

The content of the compound having a conjugated double bond and a molecular weight of 1000 or less in the EVOH composition is preferably 0.000001 to 0.01 parts by mass with respect to 100 parts by mass of the EVOH. The content is more preferably 0.000002 parts by mass or more, further preferably 0.000003 parts by mass or more. Meanwhile, the content is more preferably 0.0075 parts by mass or less, further preferably 0.005 parts by mass or less, particularly preferably 0.0025 parts by mass or less.

In the present invention, the method for adding the compound having a conjugated double bond and a molecular weight of 1000 or less is not specifically limited. Examples thereof include: 1) a method of adding the compound to the ethylene-vinyl ester copolymer obtained, followed by saponification, 2) a method of adding the compound when saponifying the ethylene-vinyl ester copolymer, 3) a method of spraying a solution containing the compound to the EVOH, 4) a method of impregnating the EVOH in a solution containing the compound, followed by drying, 5) a method of preparing an aqueous solution containing the EVOH and the compound, followed by drying, and 6) a method of preparing an aqueous solution containing the EVOH and the compound and using the aqueous solution for various applications. Among them, the method 6) is preferred for ease of adjusting the content of the compound.

(Applications)

The EVOH of the present invention is used for various applications. Examples thereof are as follows, but there is no limitation to these examples.

(1) Adhesive applications: adhesives, sticking agents, re-wet adhesives, various binders, and cement and mortar additives
(2) Dispersant applications: dispersion stabilizers for organic and inorganic pigments such as paints and adhesives, dispersion stabilizers and dispersion aids for suspension polymerization of various vinyl compounds such as vinyl chloride, vinylidene chloride, styrene, (meth)acrylate, and vinyl acetate
(3) Dressing applications: coating agents for paper, sizing agents, fiber processing agents, leather finishing agents, paints, antifogging agents, metal corrosion inhibitors, galvanizing brighteners, antistatic agents, and pharmaceutical dressings
(4) Emulsifier applications: emulsifiers for emulsion polymerization, post-emulsifiers such as bitumen
(5) Flocculant applications: flocculants for suspensions and dissolved materials in water and metal flocculants
(6) Formed product applications: fibers, films, sheets, pipes, tubes, leak-proof membranes, water-soluble fibers for chemical lace, and sponges
(7) Film applications: water-soluble films, polarization films, and barrier films
(8) Gel applications: pharmaceutical gels and industrial gels
(9) Post-reaction applications: post-reaction applications with low-molecular weight organic compounds, polymer organic compounds, and inorganic compounds

EXAMPLES

Hereinafter, the present invention will be described further in detail by way of examples. In Examples and Comparative Examples below, “part(s)” and “%” respectively indicate part(s) by mass and mass %, unless otherwise specified.

[Ethylene Unit Content of EVOH]

The ethylene unit content of the EVOH was determined from $^1$H-NMR of the ethylene-vinyl ester copolymer as a precursor of the EVOH. Specifically, the ethylene-vinyl ester copolymer of each of Examples and Comparative Examples was reprecipitated and purified three times or more using a mixed solution of n-hexane and acetone and then dried under reduced pressure at 80° C. for 3 days to produce an analysis sample. The sample was dissolved in DMSO-$d_6$ and subjected to $^1$H-NMR (500 MHz) measurement at 80° C. The ethylene unit content was calculated from the following formula using the peak (integral value P) (from 4.7 to 5.2 ppm) derived from the main chain methine of vinyl ester and the peak (integral value Q) (from 0.8 to 1.6 ppm) derived from the main chain methylene of ethylene and vinyl ester.

$$\text{Ethylene Unit Content (mol \%)} = \frac{(Q-2P)/4}{P+(Q-2P)/4} \times 100$$

[Viscosity-Average Degree of Polymerization of EVOH]

The viscosity-average degree of polymerization of the EVOH was measured according to JIS K 6726:1994. Specifically, the limiting viscosity [η] (liter/g) of the EVOH was measured in water at 30° C., and then the viscosity-average degree of polymerization was determined by the following formula. In the case where the saponification degree was less than 99.5 mol %, the EVOH was saponified to a saponification degree of 99.5 mol % or more, and then the EVOH was measured for limiting viscosity [η] (liter/g).

$$P = ([\eta] \times 10^4 / 8.29)^{(1/0.62)}$$

[Saponification Degree of EVOH]

The saponification degree of the EVOH was determined by the method according to JIS K 6726:1994.

[Contents of Structures (I) and (II)]

The EVOH was dissolved in DMSO-$d_6$ and measured at 45° C. using $^1$H-NMR at 500 MHz, to determine the contents of the structures (I) and (II) from the ratio of the peak intensity of ethylene units, vinyl alcohol units, or vinyl ester units to the peak intensity of methyl hydrogen of the methoxy group or methylene hydrogen of the ethoxy group of the structures (I) and (II). The peak of methyl hydrogen of the methoxy group or methylene hydrogen of the ethoxy group of the structure (I) and the peak of methyl hydrogen of the methoxy group or methylene hydrogen of the ethoxy group of the structure (II) were respectively detected around 3.07 ppm and 3.09 ppm.

[Water Insoluble Content of EVOH]

Under stirring at 300 rotations/minute, 4 g of the EVOH was added to 96 g of water at 30° C., and the water temperature was increased up to 90° C. over 120 minutes. The entire amount of the aqueous solution obtained with a 200-mesh wire screen (in terms of mesh of JIS standard sieve, the mesh opening was 75 μm; the mesh opening of the sieve conforms to the nominal opening W of JIS Z 8801-1-2006) was filtered and completely dried together with the wire screen by drying at 105° C. for 3 hours. The mass a (g) of the wire screen before filtration and the mass b (g) of the wire screen after complete drying were substituted into the following formula, to determine the water insoluble content in the EVOH (ppm).

$$\text{Water insoluble content (ppm)} = 1000000 \times \{(b-a)/4\}$$

[High-Speed Coatability]

The adhesive obtained in each of Examples and Comparative Examples below was evaluated using three rolls. FIG. 1 shows the three rolls used at this time. The surface temperature of each roll was adjusted to 30° C. The adhesive [IV] prepared was added between the roll [II] and the roll [III], and the roll [I] was rotated at a surface speed of 100 m/minute, to evaluate each item below.

(1) Jumping

Whether or not droplets of the adhesive jumped out from between the roll [I] and the roll [II] was determined by visual inspection according to the following criteria.

A: No droplets jumped out
B: A few droplets jumped out
C: Many droplets jumped out (2) Roll Transfer Whether or not the adhesive was uniformly applied onto the roll [I] was visually determined.

A: Uniform

B: Non-uniform (3) Foaming

The three rolls were rotated for 5 minutes. The bubble intrusion of the adhesive [IV] was evaluated from the ratio (mass after rotation/mass before rotation) of the mass of 100 ml of the adhesive [IV] after rotating the rolls to the mass of 100 ml of the adhesive [IV] before rotating the rolls.

(4) Stringing

The stringing of the adhesive between the roll [I] and the roll [II] was checked by visual inspection.

A: No stringing was observed

B: Stringing was observed

[Water-Resistant Adhesiveness]

The adhesive obtained by each of Examples and Comparative Examples below was applied to kraft paper using a Bird film applicator with a gap of 50 μm, and then the kraft paper was immediately laminated on each other and cured under conditions of 20° C. and 65% RH for 24 hours. The kraft paper laminated was immersed in water at 20° C. for 24 hours. The bonded portion was peeled off after immersion, to determine the water-resistant adhesiveness from the situation according to the following criteria.

A: Kraft paper did not peel off from each other throughout the entire bonded portion, and the kraft paper itself broke.

B: Kraft paper did not peel off from each other in a part of the bonded portion, and the kraft paper itself broke.

The inorganic fillers used are shown below.

Inorganic filler 1: Kaolinite clay "ASP-200" (average particle size: 0.55 μm), available from Engelhard Corporation Inorganic filler 2: Kaolinite clay "Huber-900" (average particle size: 0.6 μm), available from HUBERS KK Inorganic filler 3: Heavy calcium carbonate "WHITON P-30" (average particle size: 1.75 μm), available from Shiraishi Kogyo Kaisha, Ltd.

Example 1

A continuous polymerization tank provided with a reflux condenser, a raw material supply line, a reaction solution extraction line, a thermometer, a nitrogen inlet, an ethylene inlet, and a stirring blade was used. 671 L/hr of vinyl acetate, 147 L/hr of methanol, and 1 L/hr of a 1% methanol solution of 2,2'-azobis(4-methoxy-2,4-dimethylvaleronitrile) (AMV) as an initiator were continuously supplied to the continuous polymerization tank using a metering pump. The ethylene pressure within the polymerization tank was adjusted to 0.23 MPa. The polymerization solution was continuously taken out from the continuous polymerization tank, so that the liquid surface within the polymerization tank should be constant. The polymerization ratio at the exit of the continuous polymerization tank was adjusted to 30%. The residence time in the continuous polymerization tank was 5 hours. The temperature at the exit of the continuous polymerization tank was 60° C. The polymerization solution was recovered from the continuous polymerization tank, and methanol vapor was introduced into the solution recovered under heating at 75° C. in a water bath, to remove unreacted vinyl acetate monomers. Thus, a methanol solution (concentration: 32%) of an ethylene-vinyl acetate copolymer (which may hereinafter be abbreviated as "EVAc") was obtained. The average residence time in the unreacted monomer-removing step was 2 hours, and residual vinyl acetate monomers in the methanol solution of the ethylene-vinyl ester copolymer obtained (which may hereinafter be abbreviated as "VAc") was 0.1%.

Then, sodium hydroxide was added to the methanol solution of the ethylene-vinyl ester copolymer as a saponification catalyst, so that the molar ratio of sodium hydroxide to the vinyl acetate monomer units in the EVAc should be 0.012, and the water content of the methanol solution was adjusted to 0.5%, to perform saponification reaction at 40° C. for 1 hour. The EVOH obtained was immersed in methanol (first washing solution) at 40° C. with a water content adjusted to 0.7% for 40 minutes, to perform a first washing step. At this time, the amount of each component to be added was adjusted, so that the concentration (slurry concentration) of the EVOH should be 15%. Then, the solvent was removed by centrifugation. Thereafter, a second washing step of the EVOH was performed in the same manner as in the first step except that methanol with a water content adjusted to 0.1% (second washing solution) was used. Then, the solvent was removed by centrifugation, followed by drying, to obtain an EVOH 1 with an ethylene unit content of 2 mol %, a viscosity-average degree of polymerization of 1700, a saponification degree of 98.5 mol %, a content of the structure (I) of 0.00114 mol %, and a content of the structure (II) of 0.0002 mol %. The water insoluble content in the EVOH 1 was 150 ppm. Tables 1 and 2 show these results.

Powder of the EVOH 1 obtained (32 parts by mass) and the inorganic filler 1 (68 parts by mass) were sufficiently dry-blended and then put into water (331 parts by mass at 20° C.) under stirring. Further, 0.004 parts by mass of 2,4-diphenyl-4-methyl-1-pentene (DPMP) with respect to 100 parts by mass of the EVOH 1 was put into water as the compound having a conjugated double bond and a molecular weight of 1000 or less, heated up to 95° C., and kept warm for 2 hours, to dissolve the EVOH (A1). The solid content concentration of the aqueous solution of the EVOH 1 thus obtained was 23.2%, and the viscosity at 20° C. and 30 rpm was 1240 mPa·s. The aqueous solution was used as an adhesive, and the high-speed coatability and the water-resistant adhesiveness were evaluated according to the aforementioned methods. Table 3 shows the results.

Examples 2 to 8 and Comparative Examples 1 to 6

EVOH 2 to EVOH 14 were produced in the same manner as in Preparation Example 1 except that the polymerization conditions such as the ethylene pressure, the amount of vinyl acetate used, the amount of methanol used, the amount and concentration of the initiator used, and the polymerization ratio, the saponification conditions such as the concentration of the EVAc and the molar ratio of NaOH to the ethylene-vinyl ester copolymer, and the washing conditions such as the water contents of the washing solutions were changed. Table 1 shows the production conditions, and Table 2 shows the compositions of the EVOHs produced, the water insoluble contents, and the like.

Adhesives were produced and evaluated in the same manner as in Example 1 except that the type of the EVOH used, the type of the inorganic filler, the type and the content of the compound having a conjugated double bond and a molecular weight of 1000 or less, and the solid content concentration were changed as shown in Table 3. Table 3 shows the results.

TABLE 1

| | EVOH | Polymerization conditions: Ethylene (MPa) | Vac (L/hr) | Methanol (L/hr) | AMV flow rate (L/hr) | AMV concentration % | Polymerization ratio (%) | Saponification conditions: PVAc concentration (%) | NaOH[1] (Molar ratio) | Washing conditions[2]: Water content of first washing solution (%) | Water content of second washing solution (%) |
|---|---|---|---|---|---|---|---|---|---|---|---|
| Example 1 | EVOH 1 | 0.23 | 671 | 147 | 2.0 | 1 | 30 | 32 | 0.012 | 0.7 | 0.1 |
| Example 2 | EVOH 2 | 0.23 | 671 | 147 | 2.0 | 1 | 30 | 32 | 0.009 | 0.7 | 0.1 |
| Example 3 | EVOH 3 | 0.1 | 618 | 2 | 168.2 | 1 | 78 | 45 | 0.023 | 0.7 | 0.1 |
| Example 4 | EVOH 4 | 0.26 | 741 | 64 | 1.7 | 1 | 26 | 25 | 0.015 | 0.7 | 0.1 |
| Example 5 | EVOH 5 | 0.47 | 726 | 113 | 2.2 | 1 | 28 | 30 | 0.012 | 0.7 | 0.1 |
| Example 6 | EVOH 6 | 0.61 | 631 | 160 | 7.6 | 1 | 43 | 40 | 0.012 | 0.7 | 0.1 |
| Example 7 | EVOH 7 | 0.69 | 626 | 170 | 75.8 | 1 | 70 | 45 | 0.012 | 0.7 | 0.1 |
| Example 8 | EVOH 8 | 0.23 | 671 | 147 | 2.0 | 1 | 30 | 32 | 0.012 | 1.5 | 0.1 |
| Comparative Example 1 | EVOH 9 | 0.23 | 671 | 147 | 2.0 | 1 | 30 | 32 | 0.004 | 0.7 | 0.1 |
| Comparative Example 2 | EVOH 10 | 0.26 | 683 | 36 | 1.2 | 1 | 18 | 22 | 0.02 | 0.7 | 0.1 |
| Comparative Example 3 | EVOH 11 | 0.23 | 671 | 147 | 2.0 | 1 | 30 | 32 | 0.012 | 0.05 | 0.1 |
| Comparative Example 4 | EVOH 12 | 1.17 | 583 | 160 | 77.0 | 1 | 60 | 45 | 0.023 | 0.7 | 0.1 |
| Comparative Example 5 | EVOH 13 | 0.1 | 618 | 2 | 168.2 | 2.5 | 78 | 45 | 0.023 | 0.7 | 0.1 |
| Comparative Example 6 | EVOH 14 | 0.69 | 626 | 170 | 75.8 | 1 | 70 | 45 | 0.012 | 0.7 | 1.5 |

[1]Molar ratio of NaOH to vinyl acetate monomer units in PVAc

[2]Slurry concentration: 15%, Washing solution temperature: 40° C., Washing time: 40 minutes

TABLE 2

| | EVOH | Ethylene unit content (mol %) | Polymerization degree | Content of (I) (mol %) | Content of (II) (mol %) | Total content of (I) and (II) (mol %) | Value of R | Value of formula 1 (0.92 − Et/100) | Saponification degree (mol %) | Water insoluble content (ppm) |
|---|---|---|---|---|---|---|---|---|---|---|
| Example 1 | EVOH 1 | 2 | 1700 | 0.00114 | 0.0002 | 0.00134 | 0.85 | 0.90 | 98.5 | 150 |
| Example 2 | EVOH 2 | 2 | 1700 | 0.00104 | 0.0003 | 0.00134 | 0.78 | 0.90 | 90.0 | 50 |
| Example 3 | EVOH 3 | 2 | 500 | 0.04100 | 0.006 | 0.04700 | 0.87 | 0.90 | 99.6 | 100 |
| Example 4 | EVOH 4 | 2 | 2300 | 0.00101 | 0.00018 | 0.00119 | 0.85 | 0.90 | 98.8 | 300 |
| Example 5 | EVOH 5 | 4 | 1700 | 0.00120 | 0.00026 | 0.00146 | 0.82 | 0.88 | 98.5 | 280 |
| Example 6 | EVOH 6 | 6 | 1000 | 0.00300 | 0.00077 | 0.00377 | 0.80 | 0.86 | 98.5 | 500 |
| Example 7 | EVOH 7 | 10 | 400 | 0.03980 | 0.0142 | 0.05400 | 0.74 | 0.82 | 98.5 | 1200 |
| Example 8 | EVOH 8 | 2 | 1700 | 0.00091 | 0.00043 | 0.00134 | 0.68 | 0.90 | 98.5 | 20 |
| Comparative Example 1 | EVOH 9 | 2 | 1700 | 0.00099 | 0.00035 | 0.00134 | 0.74 | 0.90 | 72.0 | Insoluble |
| Comparative Example 2 | EVOH 10 | 2 | 3100 | 0.00114 | 0.00018 | 0.00132 | 0.86 | 0.90 | 99.3 | 450000 |
| Comparative Example 3 | EVOH 11 | 2 | 1700 | 0.00129 | 0.00005 | 0.00134 | 0.96 | 0.90 | 98.5 | 50000 |
| Comparative Example 4 | EVOH 12 | 16 | 400 | 0.02141 | 0.00829 | 0.02970 | 0.72 | 0.76 | 99.6 | Insoluble |
| Comparative Example 5 | EVOH 13 | 2 | 500 | 0.10220 | 0.0138 | 0.11600 | 0.88 | 0.90 | 99.6 | 70000 |
| Comparative Example 6 | EVOH 14 | 10 | 400 | 0.04830 | 0.0057 | 0.05400 | 0.89 | 0.82 | 98.5 | 12000 |

The EVOH 9 obtained in Comparative Example 1 had an excessively low saponification degree and thus was insoluble in water, so that the water insoluble content could not be measured. The EVOH 10 obtained in Comparative Example 2 had an excessively high polymerization degree and thus had a large water insoluble content and a poor solubility. The EVOH 11 obtained in Comparative Example 3 had an excessively high molar ratio R [I/(I+II)] so as not to satisfy formula (1) and thus had a large water insoluble content and a poor solubility. The EVOH 12 obtained in Comparative Example 4 had an excessively large ethylene content and thus was insoluble in water, so that the water insoluble content could not be measured. The EVOH 13 obtained in Comparative Example 5 had an excessively large content of the structure (I) and thus had a large water insoluble content and a poor solubility. The EVOH 14 obtained in Comparative Example 6 had an excessively high molar ratio R [I/(I+II)] so as not to satisfy formula (1) and thus had a large water insoluble content and a poor solubility.

TABLE 3

| | EVOH | Inorganic filler Type[1)] | Inorganic filler Content[3)] (parts by mass) | Compound having a conjugated double bond Type[2)] | Compound having a conjugated double bond Content[3)] (parts by mass) | Solid content concentration (%) | high-speed coatability Viscosity (mPa · s) | high-speed coatability Jumping | high-speed coatability Roll transfer | high-speed coatability Foaming[4)] | high-speed coatability Stringing | Water-resistant adhesiveness Application of 50 μm |
|---|---|---|---|---|---|---|---|---|---|---|---|---|
| Example 1 | EVOH 1 | 1 | 212 | DPMP | $40 \times 10^{-4}$ | 23.2 | 1240 | A | A | 0.90 | A | A |
| Example 2 | EVOH 2 | 1 | 212 | SA | $1.8 \times 10^{-4}$ | 22.9 | 1190 | A | A | 0.87 | A | A |
| Example 3 | EVOH 3 | 2 | 212 | SA | $1.8 \times 10^{-4}$ | 35.9 | 1280 | A | A | 0.91 | A | A |
| Example 4 | EVOH 4 | 3 | 212 | SA | $1.8 \times 10^{-4}$ | 17.5 | 1300 | A | A | 0.92 | A | A |
| Example 5 | EVOH 5 | 2 | 212 | SA | $1.8 \times 10^{-4}$ | 23.5 | 1320 | A | A | 0.93 | A | A |
| Example 6 | EVOH 6 | 1 | 212 | SA | $1.8 \times 10^{-4}$ | 28.0 | 1300 | A | A | 0.90 | A | A |
| Example 7 | EVOH 7 | 2 | 212 | SA | $0.08 \times 10^{-4}$ | 37.9 | 1310 | A | A | 0.91 | A | A |
| Example 8 | EVOH 8 | 1 | 212 | DPMP | $40 \times 10^{-4}$ | 23.2 | 1190 | A | A | 0.93 | A | A |
| Comparative Example 1 | EVOH 9 | | | Insoluble in water, subsequent evaluation of physical properties impossible | | | | | | | | |
| Comparative Example 2 | EVOH 10 | 3 | 212 | SA | $1.8 \times 10^{-4}$ | 12.5 | 1210 | A | B | 0.88 | B | A |
| Comparative Example 3 | EVOH 11 | 1 | 212 | DPMP | $40 \times 10^{-4}$ | 22.8 | 1260 | C | A | 0.83 | B | A |
| Comparative Example 4 | EVOH 12 | | | Insoluble in water, subsequent evaluation of physical properties impossible | | | | | | | | |
| Comparative Example 5 | EVOH 13 | 2 | 212 | SA | $1.8 \times 10^{-4}$ | 35.9 | 1280 | A | A | 0.81 | B | B |
| Comparative Example 6 | EVOH 14 | 2 | 212 | SA | $0.08 \times 10^{-4}$ | 37.3 | 1300 | B | A | 0.83 | B | A |

1)1: Kaolinite clay (average particle size 0.55 μm), 2: Kaolinite clay (average particle size 0.6 μm), 3: Heavy calcium carbonate (average particle size 1.75 μm)
2)DPMP: 2,4-diphenyl-4-methyl-1-pentene, SA: sorbic acid
3)Content of the inorganic filler or the compound having a conjugated double bond with respect to 100 parts by mass of the EVOH.
4)Mass of adhesive after roll rotation/mass of adhesive before roll rotation The EVOH 9 obtained in Comparative Example 1 had an excessively low saponification degree and thus was insoluble in water, so that no aqueous solution could be obtained, and evaluation as an adhesive was impossible. In the case of using the EVOH 10 with a high polymerization degree obtained in Comparative Example 2, the adhesive was not uniformly transferred to the rolls, many strings were generated from the adhesive, bubble intrusion occurred, and the high-speed coatability was insufficient. In the case of using the EVOH 11, obtained in Comparative Example 3, having an excessively high molar ratio R [I/(I+II)] and not satisfying formula (1), many droplets of the adhesive jumped out from between the rolls (jumping), many strings were generated from the adhesive, bubbles were heavily intruded in the adhesive, and the high-speed coatability was insufficient. The EVOH 12 obtained in Comparative Example 4 had an excessively large ethylene content and was thus insoluble in water, so that no aqueous solution could be obtained, and evaluation as an adhesive was impossible. In the case of using the EVOH 13, obtained in Comparative Example 5, having a large content of the structure (I), many strings were generated from the adhesive, bubbles were heavily intruded in the adhesive solution, the high-speed coatability was insufficient, and the water-resistant adhesiveness was also insufficient. In the case of using the EVOH 14, obtained in Comparative Example 6, having an excessively high molar ratio R [I/(I+II)] and not satisfying formula (1), droplets of the adhesive jumped out from between the rolls (jumping), many strings were generated from the adhesive, bubbles were heavily intruded in the adhesive solution, and the high-speed coatability was insufficient.

As shown in Examples, the EVOH of the present invention has excellent water solubility. Further, an adhesive consisting of an aqueous solution containing the EVOH of the present invention has excellent high-speed coatability and excellent water-resistant adhesiveness. Accordingly, the industrial usefulness of the present invention is extremely high.

The invention claimed is:

1. An ethylene-vinyl alcohol copolymer, comprising:

a structure (I)

(I)

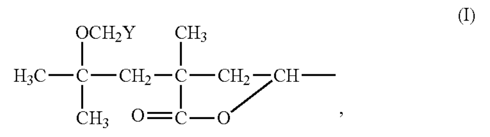

Y being H or a methyl group, at an end; and a structure (II)

(II)

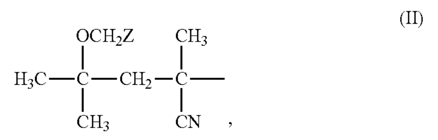

Z being H or a methyl group, at an end; and wherein a total content of the structure (I) and the structure (II) in all monomer units is in a range of from 0.001 to 0.00377 mol %, wherein a molar ratio R [I/(I+II)] of the structure (I) to a total of the structures (I) and (II) satisfies formula (1):

$$R < 0.92 - Et/100 \quad (1)$$

wherein Et is an ethylene unit content (mol %), wherein the ethylene unit content of the copolymer is in a range of from 1 to less than 15 mol %, wherein the copolymer has a saponification degree in a range of from 85 to less than 99.9 mol %, and wherein the copolymer has a viscosity-average degree of polymerization in a range of from 200 to less than 3000.

2. An aqueous solution, comprising:

the ethylene-vinyl alcohol copolymer of claim 1.

3. An adhesive, consisting of:

the aqueous solution of claim 2.

4. A method for producing the ethylene-vinyl alcohol copolymer of claim 1, the method comprising:

copolymerizing ethylene and vinyl ester using an azonitrile compound comprising an alkoxy group as a polymerization initiator, to obtain an ethylene-vinyl ester copolymer;

saponifying the ethylene-vinyl ester copolymer in the presence of a basic catalyst, to obtain an ethylene-vinyl alcohol copolymer; and washing the ethylene-vinyl alcohol copolymer obtained with an organic solvent, wherein the washing comprises washing the ethylene-vinyl alcohol copolymer with a first washing solution and then washing the ethylene-vinyl alcohol copolymer with a second washing solution having a water content lower than a water content of the first washing solution, and wherein the water content of the first washing solution is less than 5 mass % and the water content of the second washing solution is 0.01 mass % or more.

5. A coating method, comprising:

applying the aqueous solution of claim 2 to a base material at a coating speed from 50 to 1000 m/minute.

6. An adhesive, comprising:

the ethylene-vinyl alcohol copolymer of claim 1.

7. The copolymer of claim 1, wherein, in the structure (I), Y is H.

8. The copolymer of claim 1, wherein, in the structure (I), Y is the methyl group.

9. The copolymer of claim 1, wherein, in the structure (II), Z is H.

10. The copolymer of claim 1, wherein, in the structure (II), Z is the methyl group.

11. The copolymer of claim 1, wherein, in the structure (I), Y is H, and wherein, in the structure (II), Z is H.

12. The copolymer of claim 1, wherein, in the structure (I), Y is H, and wherein, in the structure (II), Z is the methyl group.

13. The copolymer of claim 1, wherein, in the structure (I), Y is the methyl group, and wherein, in the structure (II), Z is H.

14. The copolymer of claim 1, wherein, in the structure (I), Y is the methyl group, and wherein, in the structure (II), Z is the methyl group.

15. The copolymer of claim 1, wherein, a content of structure (I) in all monomer units is in a range of from 0.00099 to 0.003 mol %.

16. The copolymer of claim 1, wherein, a water insoluble content is 10000 ppm or less.

* * * * *